UNITED STATES PATENT OFFICE.

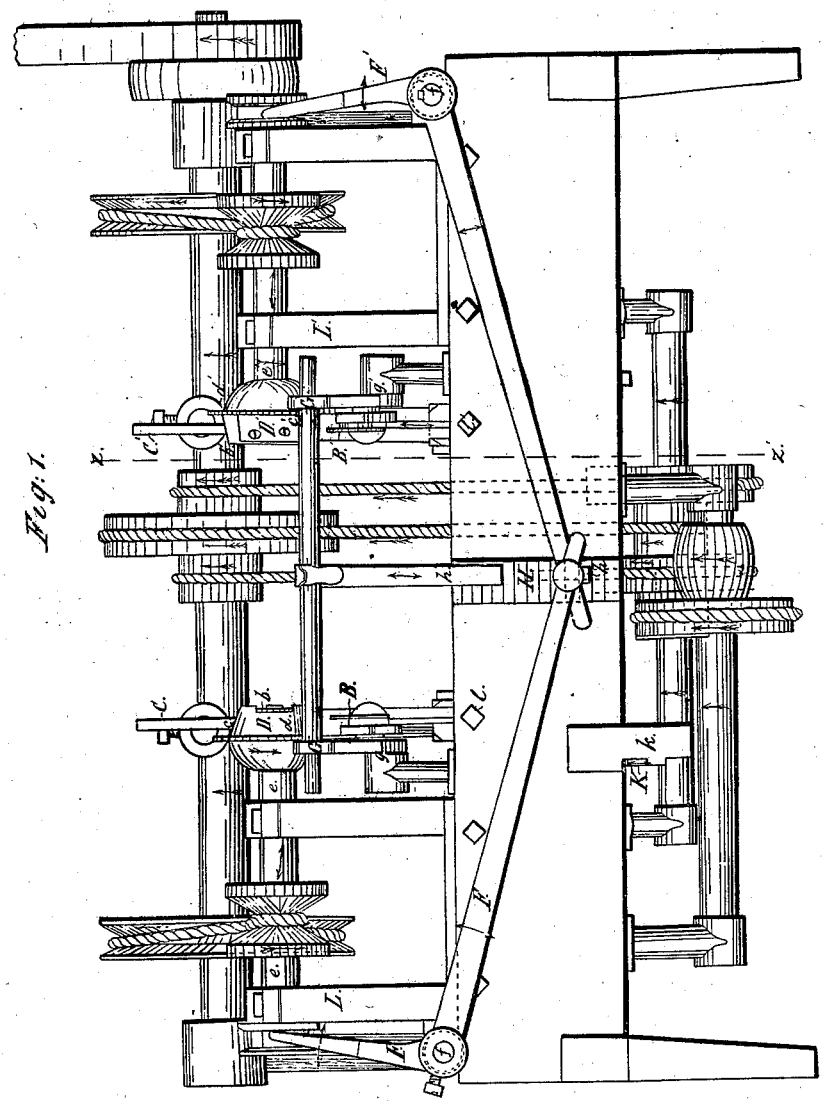

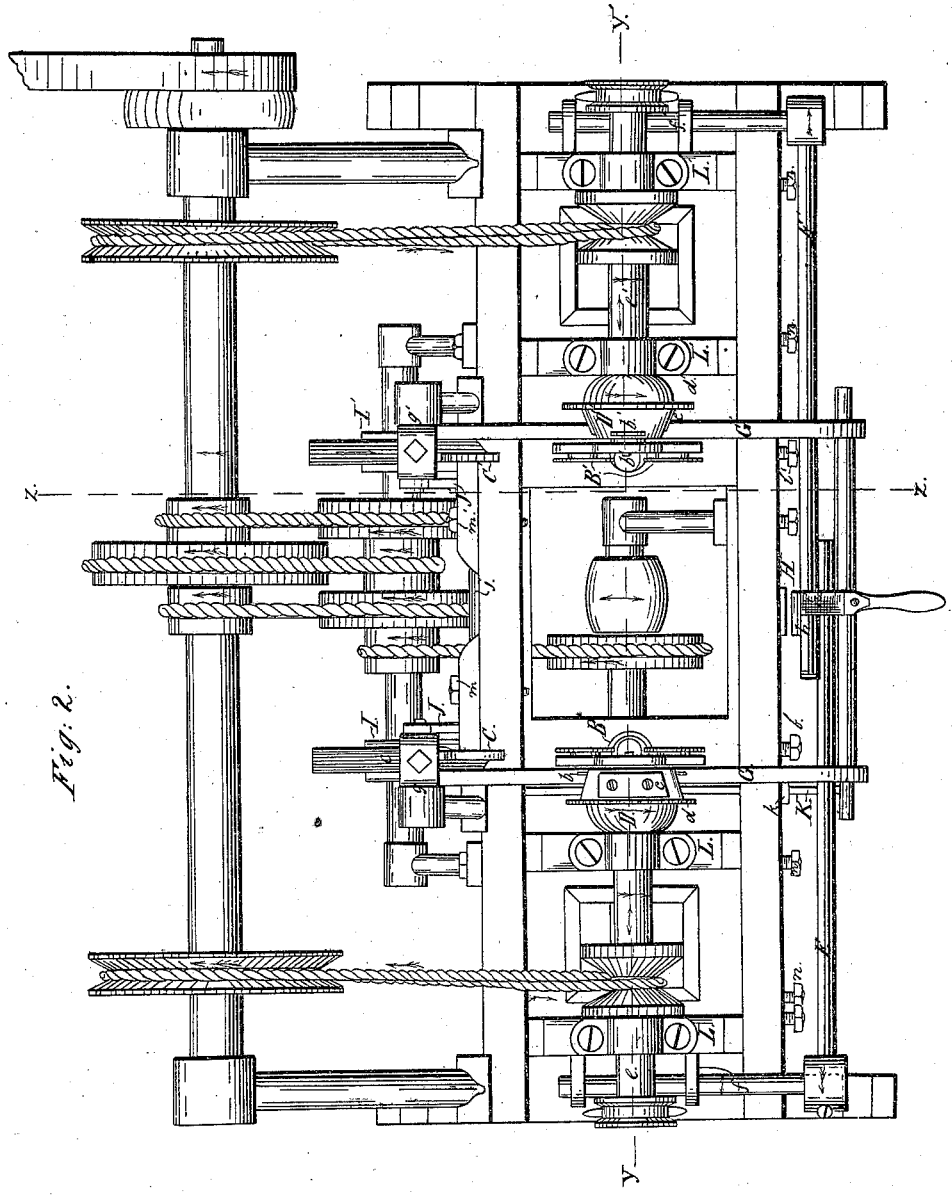

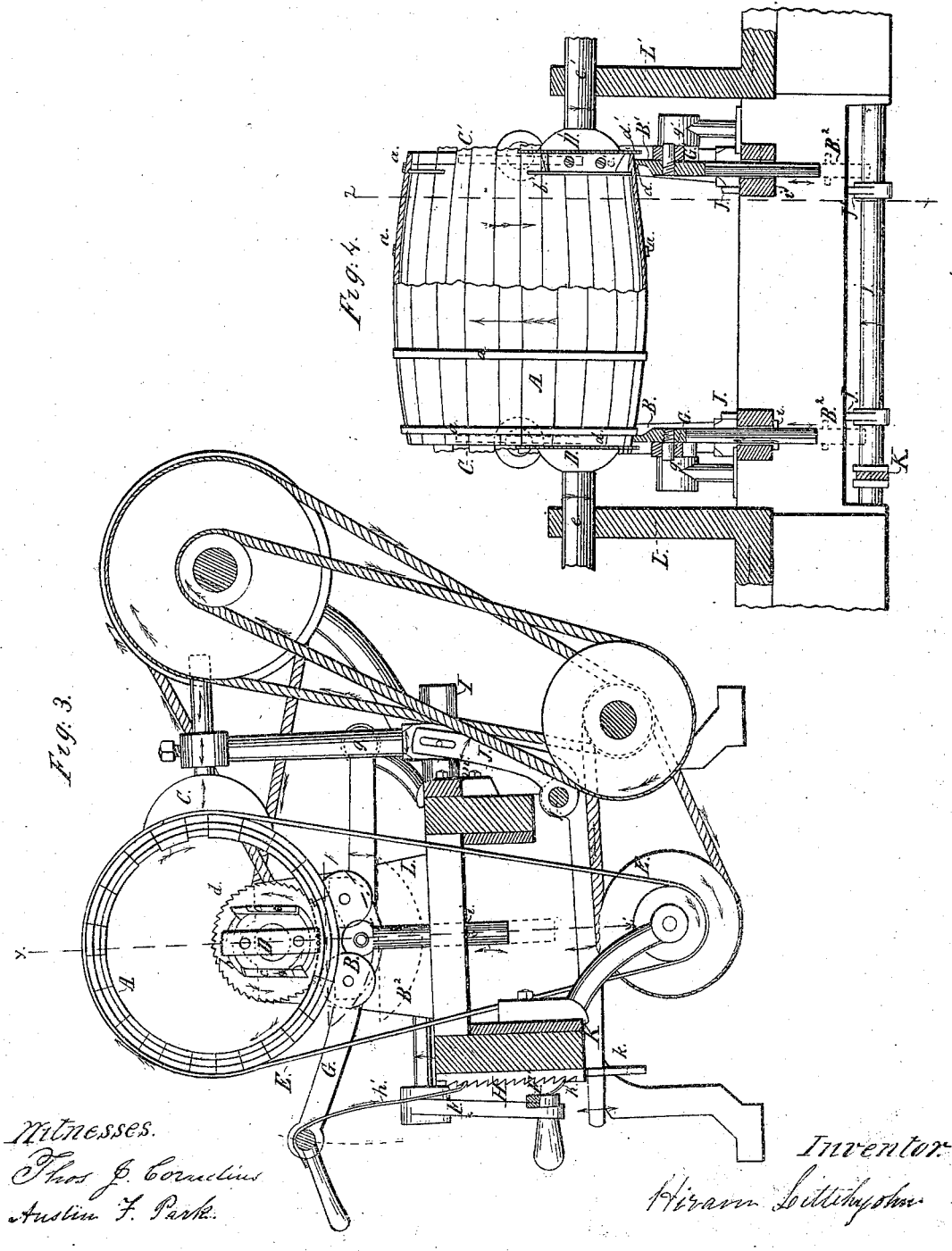

HIRAM LITTELJOHN, OF TROY, NEW YORK.

MACHINE FOR CROZING AND CHAMFERING BARRELS.

Specification of Letters Patent No. 23,097, dated March 1, 1859.

*To all whom it may concern:*

Be it known that I, HIRAM LITTELJOHN, of the city of Troy, in the county of Rennsalaer and State of New York, have invented a new and Improved Mode of Crozing and Chamfering Barrels, Kegs, or Casks; and I do hereby declare that the following is a full and exact description thereof, reference being had to the annexed drawings, making a part of this specification, in which—

Figure 1 is a front elevation, Fig. 2 a plan, Fig. 3 a section at the line $z\ z'$, and Fig. 4 a partial one at the line $y\ y'$, of the machinery used.

The same letters refer to like parts in all the figures; and the arrows on or by the parts, indicate the directions in which the parts move.

My invention consists in crozing and chamfering barrels, kegs or casks by turning the bulging cylinders of hooped staves in, upon, or against, suitable rests or supports and around rotating cutters which turn in the opposite direction to and describe circles of less diameter than the inside of the ends of the cylinders of staves; the cutters, or the rests, or both the cutters and the rests, being movable and arranged so as to allow the cylinders of staves to be conveniently applied to and taken from the rests or supports and submitted to and removed from the action of the cutters, substantially as herein set forth.

A is the bulging cylinder of staves, held together by truss-hoops, $a$. B, B′, and C, C′ are rests which support the hooped staves near their ends during the action of the cutters.

D, D′, are the rotating heads to which the crozing tools, $b$, $b'$, howeling and chamfering cutters, $c$, $c'$, and circular saws, ($d$, $d'$,) for cutting the ends of the staves even, are firmly attached. All the cutters describe circles of so much less size than the cylinder of staves that the cutters may all be introduced within the ends of the ring of staves without touching the latter. The spindles, $e$, $e'$, of the cutter heads are slid endwise so as to carry the cutter-heads within and withdraw them from the ends of the cylinders of staves; and the rests B B′ are moved up and down or at right angles to the axes of the cutter heads to bring the inner side of the ends of the cylinders of staves against, and to remove them from the rotating cutters. The cylinders of staves, A, are turned on the rests or supports and about their own axes and around the revolving cutters in a direction contrary to that in which the cutters revolve, so that the cutters shall not constantly cut upon the surface of the often gritty staves, and so that the cutters shall not draw in and split off the wood, or become stuck therein. The cylinder of staves is turned upon its supports either by the hands of the operator; or by a running belt, (E,) or other suitable mechanical device.

F, F′, are two connected bent levers, hung at $f$, $f'$, by the use of which the two cutter heads, while revolving, may be simultaneously moved by the operator toward or from each other.

G, G′, are two connected levers, hung at $g$, $g'$, by which the rests B B′ may both be raised or lowered at the same time.

H is a ratchet bar, and $h$ and $h'$ are clicks, by which the cutter-heads and the barrel rests may be held in place while the cutters are acting upon the cask.

$i$, $i'$, are stops to limit the upward movement of the rests B B′.

In using the machine, the cutter-heads being in swift revolution, the operator first slides back the cutter heads, as shown in Fig. 1, so that a cylinder of staves can be placed between them, and lowers the rests B B′, as indicated by the dotted lines $B^2$ in Figs. 3 and 4, so that the cutter-heads can be slid within the ends of the cylinder of staves when the latter is upon the rests. He then places the hooped staves upon the rests B B′ and against the rests or stops $c\ c'$; and if the ring of staves is to be turned by the belt E, puts the belt around the cask A. He next slides the cutter heads toward each other to the proper places inside of the cask, and then raises the rests B B′ so as to bring the cutters, and the belt E if used, into action, as indicated by Figs. 3 and 4. One revolution of the cylinder of staves, by hand or by machinery, completes the crozing and chamfering, and also the truing of the ends of the staves, if the latter is necessary. The operator then lowers the rests B B′, slides the cutter heads farther apart, and removes the cask, thus leaving the machine in the proper position to receive another one.

It is obvious that instead of moving the rests B B′ toward and from the revolving cutters to subject the barrel to and remove it from the action of the cutters; those rests may be stationary and the cutter-heads, after being slid to within the ends of the barrel, A, be then moved in a direction at right angles or nearly so to the axis of the barrel so as to bring the cutters into and out of action:—and, that in some cases, neither one, or only one, of the cutter-head arbors need be moved endwise to allow the cask to be placed upon the bed, with the cutter heads within its ends,—as when the cutter heads are very small in comparison with the size of the casks, or when the cutters are stopped revolving every time a cask is removed from and another placed upon the bed, B, B': Also, that instead of the rests B B' and C C', semicircular supports may be used to hold the cask. But such changes are but mere modifications such as would readily occur to any competent machinist.

It will be observed that the above-described mode leaves all the chamfered and crozed ends of the staves of the cask of substantially the same thickness, for the depth of the cutting is regulated by that part of the outer side of the cask which is directly under or opposite to the place where the cutters are acting upon the inside;—and that the cutters are not required to be movable or to be moved in their stocks; and that the kegs or casks can be "worked off" with great rapidity; also that the machine may be so altered as to croze and chamfer kegs of the same length but of different diameters, by simply moving the rests C, C'. This latter result of my invention is of much practical importance; for in many shops the coopers "set up" kegs of various diameters at the same time, so as to make it necessary that the machine should be almost instantly altered, to "work off" kegs of different diameters.

I, I', are ways for the stops C C' to slide upon.

J, J', are arms, connected by a shaft, $j$, to an arm, K, by the use of which the operator may slide the two rests C C' forward, and backward.

$k$ is a notched stud, by the use of which the arm K may be held in different positions.

It is obvious that the rests, C, C', might be immovable, and the machine still be altered to croze and chamfer kegs of different diameter; by simply moving and setting the head blocks or bearings, L, L', of both the spindles, $e, e'$, nearer to and farther from the rests C, C'. To croze and chamfer barrels of different thickness of staves, the rests B, B', may be set at different heights, or distances from the cutter heads, as by the rack H and catch $h'$. To work off casks of different lengths, the two rests, B B', two guides, C C', and two head-blocks L L', may each be set at different distances apart in the direction of the axis of the barrel, as by set screws, $l, l', m, m'$ and $n', n$.

What I claim as my invention and desire to secure by Letters Patent is—

Crozing and chamfering barrels, kegs, or casks, by turning the bulging cylinders of staves in, upon, or against suitable rests or supports and around rotating cutters which turn in the opposite direction to and describe circles of less diameter than the inside of the ends of the cylinders of staves, the cutters and the rests being so arranged together and one or both of them made movable that the cylinders of staves can be conveniently applied to and removed from the rests and cutters, substantially as herein set forth.

HIRAM LITTELJOHN.

Witnesses:
 THOS. J. CORNELIUS,
 AUSTIN F. PARK.